United States Patent
Garcia Morchon et al.

(10) Patent No.: US 10,178,123 B2
(45) Date of Patent: Jan. 8, 2019

(54) AVOIDANCE OF HOSTILE ATTACKS IN A NETWORK

(75) Inventors: Oscar Garcia Morchon, Aachen (DE); Daniel Martin Görgen, Eindhoven (DE); Tim Corneel Wilhelmus Schenk, Eindhoven (NL); Javier Espina Perez, Eindhoven (NL); Marc Aoun, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 856 days.

(21) Appl. No.: 14/122,050

(22) PCT Filed: Jun. 7, 2012

(86) PCT No.: PCT/IB2012/052883
§ 371 (c)(1),
(2), (4) Date: Nov. 25, 2013

(87) PCT Pub. No.: WO2012/168898
PCT Pub. Date: Dec. 13, 2012

(65) Prior Publication Data
US 2014/0096253 A1 Apr. 3, 2014

(30) Foreign Application Priority Data
Jun. 10, 2011 (EP) .................. 11169392

(51) Int. Cl.
*G06F 21/50* (2013.01)
*H04L 29/06* (2006.01)
(Continued)

(52) U.S. Cl.
CPC ........ *H04L 63/1458* (2013.01); *H04L 63/145* (2013.01); *H04W 12/06* (2013.01); *H04W 12/12* (2013.01); *H04W 84/18* (2013.01)

(58) Field of Classification Search
CPC . G06F 21/55; H04L 63/1408; H04L 63/1458; H04L 63/1466
See application file for complete search history.

(56) References Cited

U.S. PATENT DOCUMENTS

| | | | |
|---|---|---|---|
| 2009/0222241 A1 | 9/2009 | Dorogi | |
| 2009/0268909 A1* | 10/2009 | Girao et al. | 380/259 |
| 2012/0066764 A1* | 3/2012 | Kim | 726/22 |

FOREIGN PATENT DOCUMENTS

| | | |
|---|---|---|
| CN | 1649312 A | 8/2005 |
| CN | 101268657 A | 9/2008 |

(Continued)

OTHER PUBLICATIONS

Muraleedharan, Rajani et al "Secure Health Monitoring Network against Denial-of-Service Attacks using Cognitive Intelligence", Communication Networks and Services Research Conference, 2008, pp. 165-170.

*Primary Examiner* — Izunna Okeke

(57) ABSTRACT

For improving the protection of a network against denial of service attacks and other hostile attacks, while keeping the operation of the network simple and efficient and considering restricted capacities of single network nodes, a control unit, a system and a method for operating a network with a plurality of nodes are provided, wherein at least one operation parameter of at least one node is adjusted based on a current network phase and a data packet received by the node (10) is processed based on the operation parameter.

14 Claims, 6 Drawing Sheets

(51) Int. Cl.
  *H04W 12/12* (2009.01)
  *H04W 12/06* (2009.01)
  *H04W 84/18* (2009.01)

(56) References Cited

FOREIGN PATENT DOCUMENTS

| | | | |
|---|---|---|---|
| CN | 101883017 | A | 11/2010 |
| EP | 2120181 | A1 | 11/2009 |
| WO | 2008139360 | A1 | 11/2008 |
| WO | 2009031112 | A2 | 3/2009 |
| WO | 2011145027 | A1 | 11/2011 |

\* cited by examiner

AVOIDANCE OF HOSTILE ATTACKS IN A NETWORK

CROSS-REFERENCE TO PRIOR APPLICATIONS

This application is the U.S. National Phase application under 35 U.S.C. § 371 of International Application No. PCT/IB2012/052883, filed on Jun. 7, 2012, which claims the benefit of European Patent Application No. 11169392.5, filed on Jun. 10, 2011. These applications are hereby incorporated by reference herein.

FIELD OF THE INVENTION

The invention relates to a control unit, a system and a method for controlling a network.

BACKGROUND OF THE INVENTION

Recently, wireless mesh networks attract more and more attention, e.g. for remote control of illumination systems, building automation, monitoring applications, sensor systems and medical applications. In particular, a remote management of outdoor luminaires, so-called telemanagement, becomes increasingly important. On the one hand, this is driven by environmental concerns, since telemanagement systems enable the use of different dimming patterns, for instance as a function of time, weather conditions or season, allowing a more energy-efficient use of the outdoor lighting system. On the other hand, this is also driven by economical reasons, since the increased energy efficiency also reduces operational costs. Moreover, the system can remotely monitor power usage and detect lamp failures, which allows for determining the best time for repairing luminaires or replacing lamps.

Current radio-frequency (RF) based wireless solutions use either a star network topology or a mesh network topology. In a star network, a central controller has a direct wireless communication path to every node in the network. However, this typically requires a high-power/high-sensitivity base-station-like central controller to be placed at a high location (e.g. on top of a building), which makes the solution cumbersome to deploy and expensive. In a mesh network, the plurality of nodes does in general not communicate directly with the central controller, but via so-called multi-hop communications. In a multi-hop communication, a data packet is transmitted from a sender node to a destination node via one or more intermediate nodes. Nodes act as routers to transmit data packets from neighboring nodes to nodes that are too far away to reach in a single hop, resulting in a network that can span larger distances. By breaking long distances in a series of shorter hops, signal strength is sustained. Consequently, routing is performed by all nodes of a mesh network deciding, to which neighboring node the data packet is to be sent. Hence, a mesh network is a very robust and stable network with high connectivity and thus high redundancy and reliability.

In FIG. 1, a typical wireless network with mesh topology is shown. The wireless network comprises of a central controller 60 and a plurality of nodes 10 (N) being connected among each other by wireless communication paths 40 in a mesh topology. The wireless communication paths 40 between the nodes 10 can be constituted by RF transmissions. For this, the nodes 10 and the central controller 60 can comprise a transceiver for transmitting or receiving data packets via wireless communication paths 40, e.g. via RF transmission. In the backend, a service center 80 is situated and serves for system management. This entity normally communicates with one or more wireless networks over a third party communication channel, such as the Internet or mobile communication networks or other wired or wireless data transmission systems. In particular, the service center 80 communicates with a central controller 60 of a corresponding network as a commissioning tool in charge of controlling or configuring this network. In case of a lighting system or any other large wireless network, a network can also be divided into segments, so that a node 10 belongs to exactly one segment having one segment controller 60. Therefore, the terms "segment controller" and "central controller" should be seen as exchangeable throughout this description.

Within the mesh network, any pair of nodes 10 can communicate with each other over several hops by means of a routing protocol. For security reasons, all nodes 10 of the network may share a common key K for authentication that is used to verify hop-by-hop, whether the data packet originates from a network node 10 or from an interfering node. Therefore, if a sender node 10 sends a message to a destination node 10 via an intermediate node 10, the sender node 10 can protect the message at MAC (Media Access Control) layer. Here, protection refers to the provision of basis security services such as authentication, integrity, freshness or even confidentiality by means of a standard block cipher mode such as AES-CCM (Advance Encryptions Standard in CCM mode). To this end, the sender node 10 can for instance take the message and attach it to at least one a MIC (Message Integrity Code) generated with the AES-CCM, the common key K, and a counter C associated to the sender node and used to ensure message freshness. Upon reception of this message, the intermediate node 10 will proceed to decode the message using the key K and verify message integrity using the MIC and message freshness based on the counter C. If all verifications are successful, the intermediate node 10 will protect the message again as done by the sender node 10 and forward it to the destination node 10.

If each node 10 in the mesh network verifies the authenticity using the key K and the freshness based on the counter C of a forwarded message, a basic network protection can be provided. However, this does not cover two important situations, in which the network is very vulnerable and can be fully broken by a denial of service attack (DoS attack). The first problem is related to a commissioning phase of the network, wherein not all nodes 10 of the network have been successfully commissioned yet. Therefore, not all nodes 10 have the key K used to realize hop-by-hop security. Yet, during commissioning, a plurality of messages has to be exchanged with the segment controller 60 or even with the service center 80, so that the problem of security arises. Thus, an attacker might send fake commissioning messages overloading the network. By way of example, it can be assumed that nodes A and B have already joined the network and thus know about the common key K, while nodes C and D still have to join the network and are not yet successfully commissioned (not knowing about K). In case that node A or node B have to forward commissioning messages from nodes C or D, nodes A and B cannot check, whether these commissioning messages are authentic and fresh, since nodes C and D did not use the key K. Therefore, in this situation, an attacker might send lots of commissioning messages breaking the network and leading to denial of service. It should be noted that this problem does not only arise in the very beginning of the network set-up, but e.g.

also when adding new nodes 10 to a network. Thus, nodes 10 being in different operating states or phases, represent a serious security problem to the network.

The second security problem arises due to limited regional knowledge of the single nodes 10. In general, due to the strict memory limitations of a node 10, a node 10 cannot store all counters C or the like for all other nodes 10 of the network. Therefore, an attacker might for instance eavesdrop on a communication link on one side of the network and replay those messages in other parts of the network. This is called "wormhole attack" and illustrated in FIG. 2. In FIG. 2, a node A eavesdrops on a communication in network part 1 and sends it through a wormhole link (arrow) to node B in network part 2 for replaying the message in network part 2 or vice versa. One effect of such an attack is that all nodes 10 in network part 1 assume that nodes 10 in network part 2 are the neighbored nodes and vice versa. As a result, this affects routing and other connectivity based protocols in the network. In addition, if the new "routes" are established and the data traffic in the network starts using the shortcut through the wormhole link, the wormhole nodes A and B can start dropping data packets and cause network disruption. Moreover, although the counter C corresponding to a node 10 of network part 1 is not known by the nodes 10 in network part 2, the nodes 10 in network part 2 will just forward all replayed messages, since the message integrity code MIC can be verified. Hence, an attack can result in blocking all messages coming from network part 2 by means of messages generated in network part 1.

WO 2009/031112 A2 relates to a node and a method for establishing distributed security architecture for a wireless network.

SUMMARY OF THE INVENTION

In view of above disadvantages and problems in the prior art, it is an object of the present invention to provide a control unit, a system and a method for operating a wireless network with a plurality of nodes, wherein protection of the network against denial of service attacks or other hostile attacks is improved, while keeping the operation of the network simple and efficient and considering restricted capacities of single network nodes.

The invention is based on the idea to consider differences between various network phases to define a phase-aware system. For instance, the characteristics of commissioning, learning and operating phases can be easily distinguished, in particular regarding a vulnerability to hostile attacks. Hence, a commissioning phase may in general be less secure, since neighbor nodes, network parameters and security keys may generally be unknown to a node when joining the network. Therefore, it is suggested that a node may operate in a phase-aware manner and handle at least one of node parameters, neighborhood parameters or other network parameters according to a current network phase. This may particularly relate to handling incoming messages, connections to new or unknown nodes, requests for updating routing tables etc. depending on a current network phase. By these means, security holes, which are necessary or unavoidable for a certain network phase, may be limited in time to the respective phase, thus reducing the network vulnerability to a minimum.

According to one aspect of the present invention, a control unit for a node of a wireless network is provided, which is capable of adjusting at least one operation parameter of the node based on a current network phase and of processing a received data packet based on the adjusted operation parameter. For this, the control unit may comprise a phase-adaptation module for setting operation parameters of the node corresponding to the current network phase and a phase-aware module for operating the node accordingly. Thus, the node behavior may be tailored to the different network phases. A network phase may for instance relate to a commissioning phase, during which a node joins the network and is commissioned to be a member of the same, a learning phase, during which a node learns about its neighbors, or a working or operating phase, wherein a node operates within the network. However, in general any number N of network phases can be defined. By adapting the operation or the behavior of the single nodes to a current network phase, unnecessary security holes can be closed and reduced to a minimum according to the requirements of the respective phase.

The current network phase may be determined by predefined phase characteristics, such as a number, rate or frequency of messages (e.g. differentiated for messages having a certain message type, a certain sender) or any other feature, which is characteristic for a certain network phase. Preferably, the phase characteristics can be determined based on common network behavior during this phase. The current network phase may be determined locally by the node itself and/or centrally by a central/segment controller or a service center. In one example, a node may be adapted to determine a current network phase based on data traffic, e.g. by monitoring the network traffic either continuously or in certain time intervals. In case of centrally determining the network phase, the central/segment controller and/or service center may provide corresponding information to the nodes using secure broadcasting or unicasting or any other kind of transmission. Possibly, the central/segment controller and/or service center provides also further information together with information about the current network phase, e.g. for indicating corresponding values of one or more operation parameters and/or for setting a time period for this network phase, after which the network automatically returns to a previous network phase or to another predefined network phase. Thus, also values of operation parameters may be set centrally for this network phase. However, it is also possible that at least one operation parameter or a set of operation parameters is predefined for at least one network phase, i.e. these operation parameters may be locally defined and stored in the single nodes. In this case, these operation parameters may nevertheless be adjustable for a central/segment controller or service center.

Alternatively and/or additionally, a central/segment controller and/or service center may announce a certain network phase, i.e. independent of any determination process of the current network situation. By these means, it is possible to shift the network from an operating phase again to an earlier phase, such as a commissioning phase, e.g. for allowing new nodes to join the network. Thus, the control unit or the phase-adaptation module of the node may be adapted to switch the node to any one of the network phases by adjusting the operation parameter(s) accordingly.

Preferably, at least one network phase is limited to a time interval or operational area. The time interval may be predefined or adjustable, e.g. by a central/segment controller or a service center. The operational area might represent the whole or a part of the network. This may allow for increased security, since a vulnerable phase, such as a learning or commissioning phase, may automatically be stopped and the network may return to a more secure network phase. In one embodiment, the network or the nodes are switchable to any intermediate network phase, which is time or area limited. Thus, the network or the nodes stop this intermediate network phase automatically, after the time has passed. Then, they may return to another predefined network phase or to the previous network phase, from which the intermediate network phase was initiated.

Preferably, operation parameters of a node include at least one of a maximum or minimum number of messages or a maximum or minimum frequency or rate of messages or an area threshold or a maximum time threshold. The messages may be recognized by their type, by their sender node, by their destination, or by any other feature. For instance, during a commissioning phase, a large number of commissioning messages may be allowed or even required, while during an operating phase of the network, it may be not allowed to process any commissioning message. Similarly, only a certain number of messages may be allowed from a certain sender and/or to a certain destination. This is to avoid multiplying and replaying an overheard message in a denial of service attack. Alternatively or additionally, the operation parameters may include at least one of a routing-update-index indicating whether an update of a routing table is allowed, a setting-update-index indicating whether an update of a node setting is allowed, a commissioning index indicating whether commissioning messages are allowed, and a stranger-acceptance-index indicating whether messages from unknown nodes are allowed. For instance, during commissioning, a node does not know about its neighbor nodes, while during an operating phase, the node may consider the network as being static. Hence, during the operating phase, the at least one operation parameter of the node may be set such that the node is not allowed to update (completely) its routing table and/or to accept or forward messages from stranger nodes. As mentioned above, the operation parameters may be locally defined for one or more network phases, so that the phase-adaptation module looks up the corresponding values of the operation parameters according to the current network phase.

In a preferred embodiment of the present invention, the control unit or the phase-aware module of a node is adapted to analyze a received data packet for determining whether the network behavior and/or the data traffic is normal for the current network phase. For instance, a network behavior may be determined based on data traffic. However, the network behavior may also depend on other parameters such as daytime, power supply state and the like. Hence, these parameters may be taken into account for observing network behavior. The observed network behavior may then be compared to predefined phase characteristics. For this, a data packet may be analyzed with respect to its type, its sender, its destination or a last forwarding node. Alternatively or additionally, the frequency or number of received and/or forwarded data packets may be determined. As mentioned before, during a particular network phase, only a certain number of data packets, e.g. of a certain type, may be forwarded. Another example is the processing behavior of the node regarding data packets, whose sender or destination is unknown.

Preferably, if it is determined that the network behavior is not normal, e.g. if the network behavior deviates from one or more predefined phase characteristics of the corresponding network phase, the control unit or the phase-aware module may determine an attack state. In such an attack state, the node behavior may be adapted accordingly. For instance, the control unit of the node may apply counter measures in order to block the attack, e.g. messages to be forwarded may be dropped, processing of data packets may be refused and/or a guilty device may be identified and marked as not trustworthy. Thus, when forwarding of received data packets is refused in an attack state, flooding of the network with fake messages and thus blocking communication links of the network can be avoided. Alternatively and/or additionally, the control unit may be adapted to trigger an attack alarm. This may relate to transmitting, flooding or broadcasting an alarm message to neighboring nodes or to the central/segment controller or service center. By these means, the surrounding nodes and/or the responsible controller may be informed about a possible attack and set in the attack state, so that they may react accordingly. Hence, a central/segment controller or service center may take appropriate countermeasures. Instead of the observed network behavior deviating from predefined phase characteristics, the attack state may also be determined and/or an attack alarm may be triggered, if the control unit refuses processing of a received data packet based on the adjusted operation parameters of the node. By these means, a denial of service attack can be avoided.

In a further embodiment, processing a received data packet includes at least one of forwarding the data packet towards its destination, accepting the data packet as its destination and updating node settings or routing information based on information included in the data packet.

In a preferred embodiment, the node is a luminaire node of a lighting system, such as a street lighting system, a lighting system of a public area or any other large-scale lighting system.

According to a further aspect of the present invention, a system for a wireless network is provided that comprises a plurality of nodes, whereof at least some include a control unit according to one of the preceding embodiments, and a central controller or segment controller, wherein the plurality of nodes and the central controller comprise means for wireless communication. Preferably, the wireless network is a radio frequency network, e.g. a network for remote control or telemanagement of a lighting system. The central controller may be adapted to determine a current network phase by monitoring the status of one or more nodes. For instance, the central controller may determine whether one or more nodes have been successfully commissioned or whether a predefined percentage of nodes has been successfully commissioned. The status of a plurality of nodes may be determined by an average or mean status of the nodes. Furthermore, the central controller may be adapted to inform the nodes about the determined current network phase. This may be realized by broadcasting, unicasting, multicasting or flooding a corresponding message in the network. Alternatively or additionally, the central controller may also inform the network nodes about one or more values of one or more operation parameters according to the current network phase.

According to a further aspect of the present invention, a method for operating a wireless network with a plurality of nodes is provided, comprising the steps of adjusting at least one operation parameter of a node based on a current network phase and processing a data packet received by the node based on the adjusted operation parameter. Thus, the method according to the present invention may be adapted to be performed by a control unit or system according to one of the above-described embodiments of the present invention.

These and other aspects of the invention will be apparent from and elucidated with reference to the embodiments described hereinafter. The invention will be described in more detail with respect to exemplary embodiments that are

DETAILED DESCRIPTION

Preferred applications of the present invention are actuator networks or sensor networks for different applications such as healthcare, energy management or lighting systems, such as outdoor lighting systems (e.g. for streets, parking and public areas) and indoor lighting systems for general area lighting (e.g. for malls, arenas, parking, stations, tunnels etc.). In the following, the present invention will be explained further using the example of an outdoor lighting system for street illumination, however, without being limited to this application. In the field of lighting control, the telemanagement of outdoor luminaires via radio-frequency network technologies is receiving increasing interest, in particular solutions with applicability for large-scale installations with segments of above 200 luminaire nodes. Since radio frequency (RF) transmissions do not require high transmission power and are easy to implement and deploy, costs for setting up and operating a network can be reduced. However, the data packet transmission may alternatively use infrared communication, free-space-visible-light communication or power line communication.

In a telemanagement system for lighting control, the number of luminaire nodes 10 is extremely high. Hence, the size of the network is very large, especially when compared to common wireless mesh networks, which typically contain less than 200 nodes. In addition, the nodes 10 typically have limited processing capabilities due to cost considerations, so that processing and memory resources in the luminaire nodes 10 will be limited. Thus, security measures and communication protocols for transmitting data packets between single nodes 10 should consider the limited resources for efficient and secure data packet transmission. Finally, compared to other so-called ad-hoc mesh networks, the telemanagement system for an outdoor lighting control network is stationary, i.e. the luminaire nodes 10 do not move. Since the luminaire nodes 10 (e.g. the lamp poles) are stationary, node positions will not change over time. Thus, the physical positions of the nodes 10, for instance GPS-coordinates or other position data, may be known in the system, enabling geographic or position-based routing using pre-programmed or predefined positions, so that no GPS receiver is required in the single nodes 10. In addition, the nodes 10 do not need to send position information updates to other nodes 10.

Figure 1:
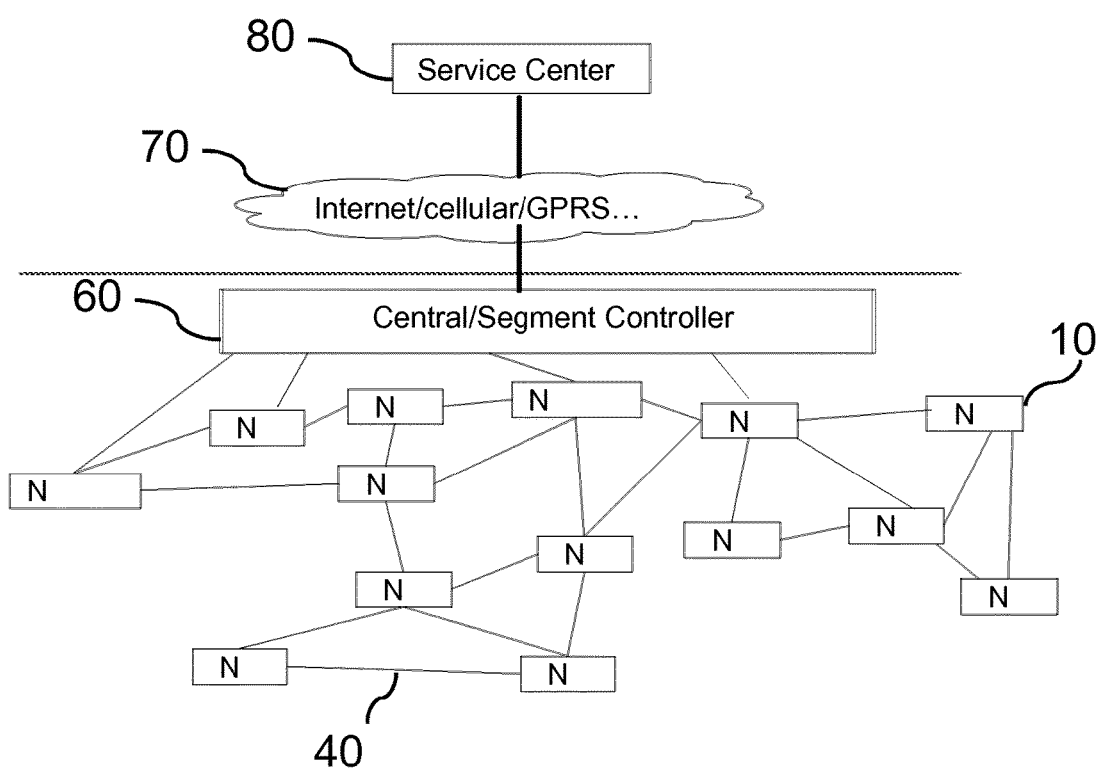
FIG. 1 illustrates an example of a wireless mesh network.
Figure 2:
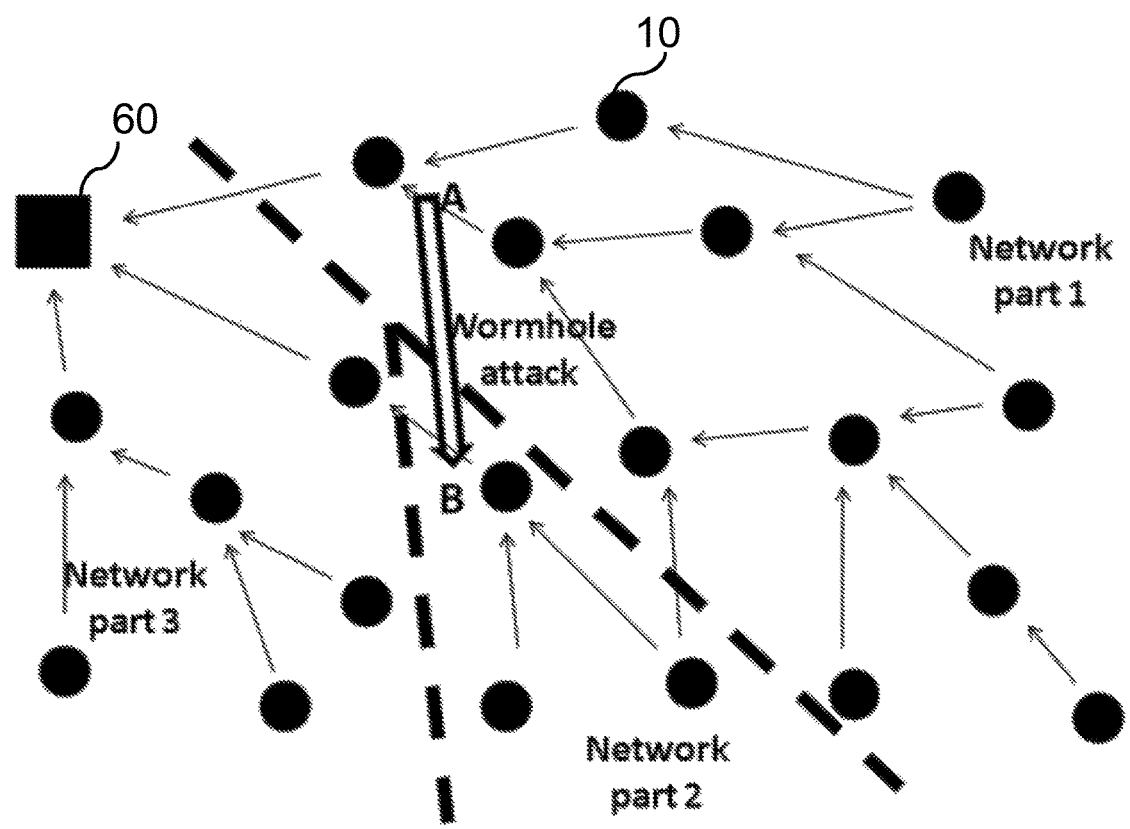
FIG. 2 illustrates a so-called wormhole attack.
Figure 3:
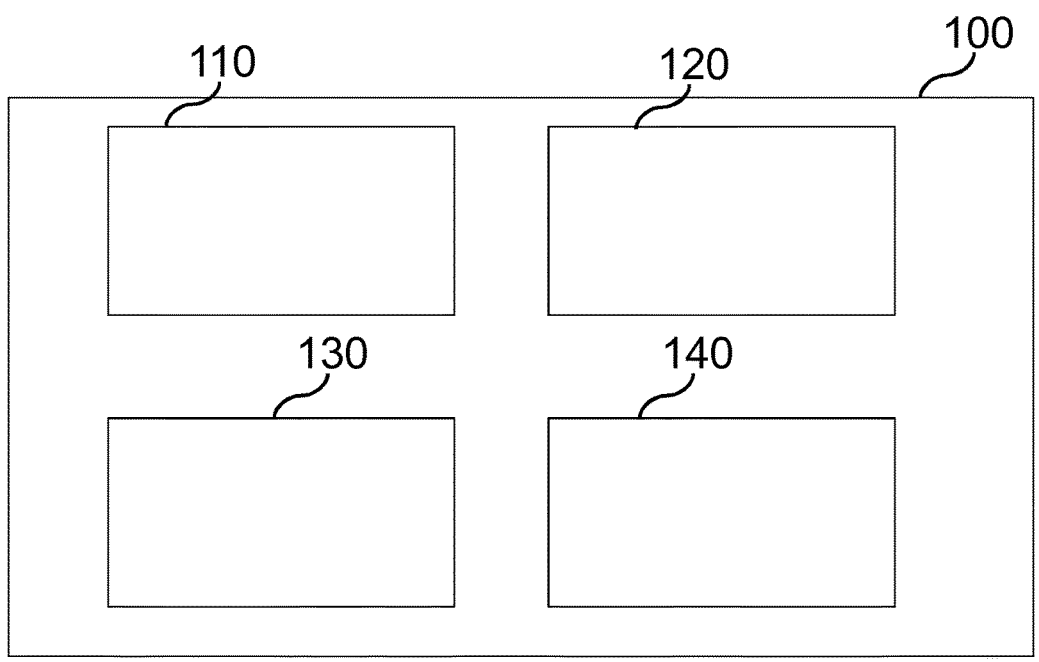
FIG. 3 shows a control unit according to an embodiment of the present invention.

In FIG. 3, an exemplary embodiment of a control unit 100 according to the present invention is shown. This control unit can be configured to be insertable in an already existing luminaire node 10 for upgrading the same, maybe as update software or the like. The control unit 100 comprises a phase-adaptation module 110 and a phase-aware module 120 for adapting the operational behavior of the node 10 to a current network phase. Of course, the phase-adaptation module 110 and the phase-aware module 120 can also be realized as a combined module. In addition, the control unit 100 may further comprise a memory 130 for storing operation parameters, routing tables, network phases and other settings of the node. Furthermore, a transmission unit may be included for wireless communication, such as radio frequency based communication (GPRS) and the like.

According to one embodiment, the phase-adaptation module 110 adjusts operation parameters of the node 10 according to the current network phase. For instance, when it is determined that the network phase has changed, the phase-adaptation module 110 of the control unit 100 adjusts the one or more of the operation parameters accordingly. The values of the operation parameters can be predefined for the different network phases and stored locally at the nodes 10. Alternatively, the operation parameters can be communicated to the nodes 10 by the service center 80 or the segment controller 60. When receiving a data packet, the phase-aware module 120 of the control unit 100 handles the received data packet according to the settings of the operation parameters. Therefore, the nodes 10 of the network are aware of the current network phase and its associated operation parameters.

For instance, operation parameters can relate to forwarding, accepting or processing a data packet, updating the routing tables or accepting configuration or commissioning messages. For example, during a commissioning phase of the network, the operation parameter of the node 10 relating to acceptance of commissioning messages (commissioning index) will be set such that the node 10 accepts commissioning messages and processes them appropriately. In contrast, in a learning phase or in an operating phase, no commissioning messages may be accepted. Similarly, it can be determined by an operation parameter, e.g. by a stranger-acceptance-index, that messages received from unknown sender nodes or from unknown intermediate nodes are admissible during the commissioning phase or learning phase, but not during the operating phase. As a further operation parameter, a number of messages per unit time may be defined, which may be set for a certain message type. For instance, during the commissioning phase, any node 10 is allowed to forward a predefined number n1 of commissioning messages per unit time, but during the operating phase, a node 10 is only allowed to forward up to n2 commissioning messages per unit time, e.g., with n1>n2. For realizing this, the phase-aware module 120 can be adapted to keep track of the number n of forwarded commissioning messages during the last unit of time $\Delta t$. When this number n exceeds a given threshold (e.g., $n>n_{phase}$), which can be set differently for each network phase, e.g. n1 for the commissioning phase and n2 for the operating phase, the node 10 drops all these commissioning messages in order to avoid flooding of the network by fake commissioning messages. In the same way, the number of messages might have to be in a specific range. Obviously, instead of a number per unit time, a frequency can be defined as operation parameter. A further example for an operation parameter is a routing-update-index indicating, whether the update of routing tables is allowed. For instance, a node 10 learns, which nodes 10 are its neighbors or close-by. This information can be used in routing protocols, e.g. a node 10 only forwards messages from/to those nodes listed in its routing table. For instance, the creation of routing tables can be limited to a certain time period, e.g. corresponding to the learning phase. After this time period has passed, the phase-adaptation module 110 can set the routing-update-index from "update allowed" to "update prohibited". Thus, during the operating phase, routing information is locked, so that the routing table cannot be changed. Hence, when receiving a message comprising new routing information, the phase-aware module 120 can check the operation parameter of the routing-update-index in order to determine whether the update of the routing table is admitted. In general, only minimal changes should be allowed during the operating phase. Therefore, after the learning phase, a node 10 of the network considers the network to be substantially static and may not allow an update of the routing table. By these means, it can be avoided that far away attacker nodes, e.g. wormhole nodes A or B, are integrated in the routing tables of the nodes 10 as neighbor nodes at a later time, thereby causing network disruption or denial of service.

The current network phase can either be locally determined at the individual nodes 10 or centrally by the service center 80 or by the segment controller 60. For a central management of the network phases, the segment controller 60 or the service center 80 can be adapted to monitor the status of the nodes 10 in order to determine the current network phase. Alternatively, the network phase may be defined in terms of time. After determining the network phase, the segment controller 60 or the service center 80 can securely broadcast to the network or unicast to each node 10 information about the current network phase. In addition, the segment controller 60 may also broadcast or unicast operation parameters associated to the respective network phase. By this centralized approach, the behavior of the nodes 10 and thus of the network can be adapted to the network phase.

In order to determine the current network phase, the segment controller 60 or the service center 80 can, e.g., monitor the nodes 10 of the network and the network traffic. For instance, when a node 10 joins the network, it is in commissioning mode. This state can be pre-configured, e.g. in the factory. The percentage of nodes 10 having already joined the network can then be centrally observed, e.g. by the segment controller 60 or by the service center 80, in order to determine the current network phase. By way of example, if the percentage of the successfully commissioned nodes 10 exceeds a predetermined threshold, usually close to 100, the segment controller 60 or service center 80 can inform the network that the commissioning phase is completed and that the network phase has changed to the learning phase. When being informed that the current network phase has changed to the learning phase, the phase-adaptation modules 110 of the nodes 10 adjust the operation parameters accordingly. If values of the operation parameters associated to the new network phase are also communicated by the segment controller 60 or the service center 80, the phase-adaptation modules 110 set the operation parameters of the nodes 10 correspondingly. After a given period of time, which can be fixed dependent on the network size or on the feedback collected from the nodes 10 of the network, the service center 80 or segment controller 60 can determine to change the current network phase from the learning phase to the operating phase. Again, the nodes 10 of the network are informed about the new network phase.

Figure 4:
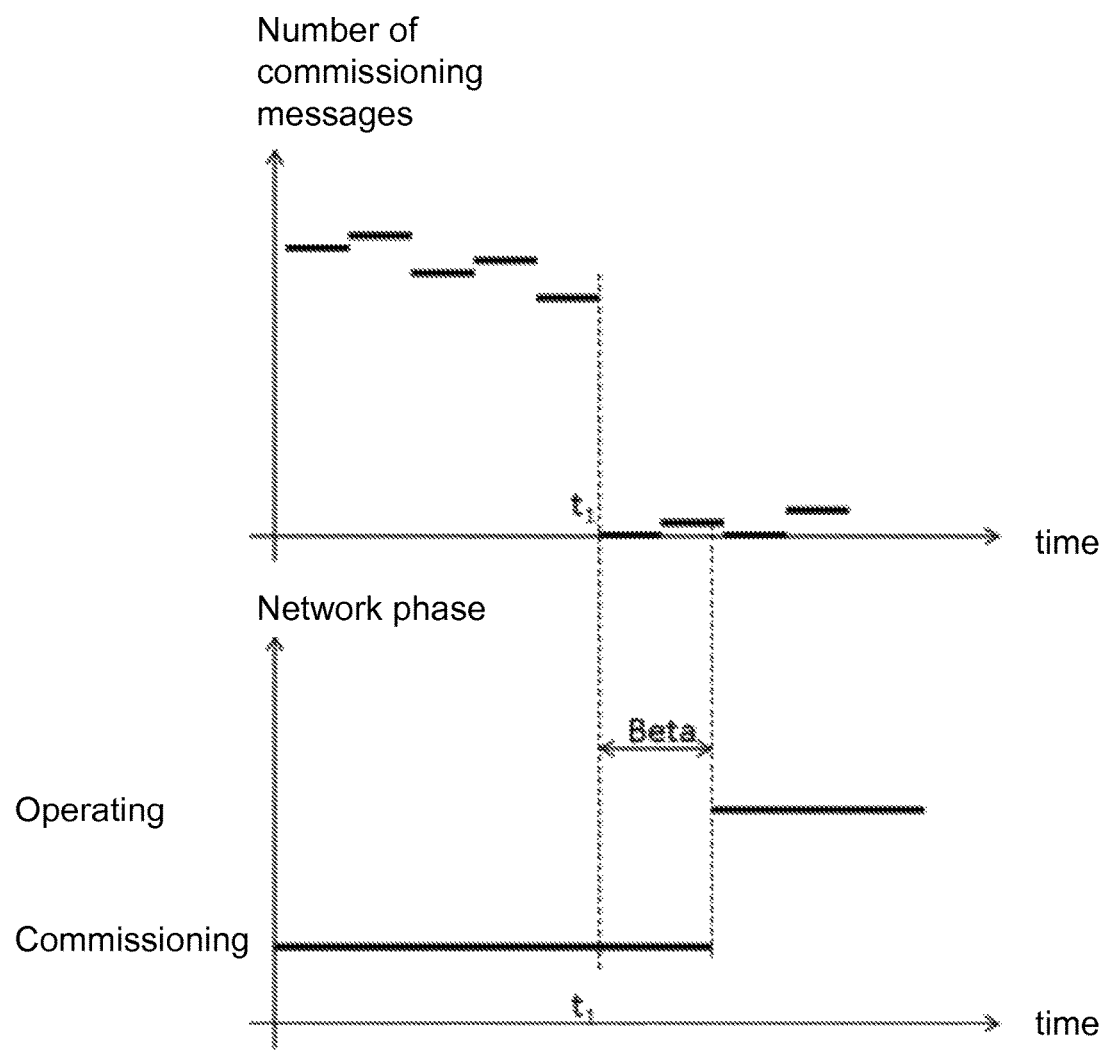
FIG. 4 shows an example for determining a network phase according to an embodiment of the present invention.

In an alternative embodiment, a distributed management of the network phases is suggested. In this embodiment, the current network phase is determined locally at the node 10, e.g. based on received messages or by observing the network traffic. In one example, each node 10 knows that it will go through at least three network phases, i.e. a commissioning phase, a learning phase and an operating phase. When a node 10 is installed in the network, it will join the network to be commissioned. During this period of time, the node 10 will observe new nodes 10 appearing and the node 10 will have to forward commissioning messages from other nodes 10. Therefore, the node 10 can keep track of the number of forwarded commissioning messages per unit time, as illustrated in the upper graph of FIG. 4. After some time, i.e. towards the end of the network commissioning, the node 10 will observe a drop in the number of commissioning messages at some time $t_1$. If the rate of commissioning messages or the frequency of commissioning messages stays low for a certain time interval Beta, the node 10 will determine that the commissioning phase is completed and that the current network phase has changed, e.g. to the operating phase, as depicted on the lower graph of FIG. 4. Thus, the node 10 can rely on own information to gain information about the current network phase without requiring intervention of the segment controller 60 or the service center 80.

In a further embodiment, the network nodes 10 are switchable to any of the network phases, regardless of whether they have been in this phase before. For instance, a RF lighting system, which is already in the operating phase, may have occasionally to be extended by additional luminaire nodes 10. In this case, it may be advantageous to switch the network to an intermediate network phase, e.g. to one of the initial network phases such as the commissioning or learning phase, depending on the circumstances. In one embodiment of central phase management, the segment controller 60 is in charge of the management of the network. Before the network is extended for adding new luminaire nodes 10, the segment controller 60 informs the network about the situation, e.g. by means of securely broadcast or unicast. For instance, the network can be informed that new luminaire nodes 10 will be included and that non-verifiable messages such as commissioning messages are allowed to be forwarded. Likewise, the network nodes 10 can be informed that it is allowed to update routing tables or general parameters or settings of the node 10. Thus, the phase-adaptation modules 110 of the single nodes 10 can set operating parameters, e.g. the routing-update-index or setting-update-index, correspondingly for indicating the new processing rules to the phase-aware module 120. Of course, an appropriate combination of operation parameters can be set by the segment controller 60 including e.g. at least one of the commissioning index, the stranger-acceptance-index, the threshold number of messages, the routing-update-index, an area threshold, a maximum time threshold and the setting-update-index.

However, by allowing these changes or updates at the nodes 10, the security of the network is weakened. Therefore, one or more of these operation parameter settings may be limited to a certain time window. Alternatively, the segment controller 60 informs the network nodes 10, when the intermediate network phase is completed. Then, the phase-adaptation modules 110 of the nodes 10 will reset the temporarily changed operation parameters to the values of the operation parameters corresponding to the network phase, from which the temporal phase has been initiated. By these means, the network remains flexible for changes.

Figure 5:
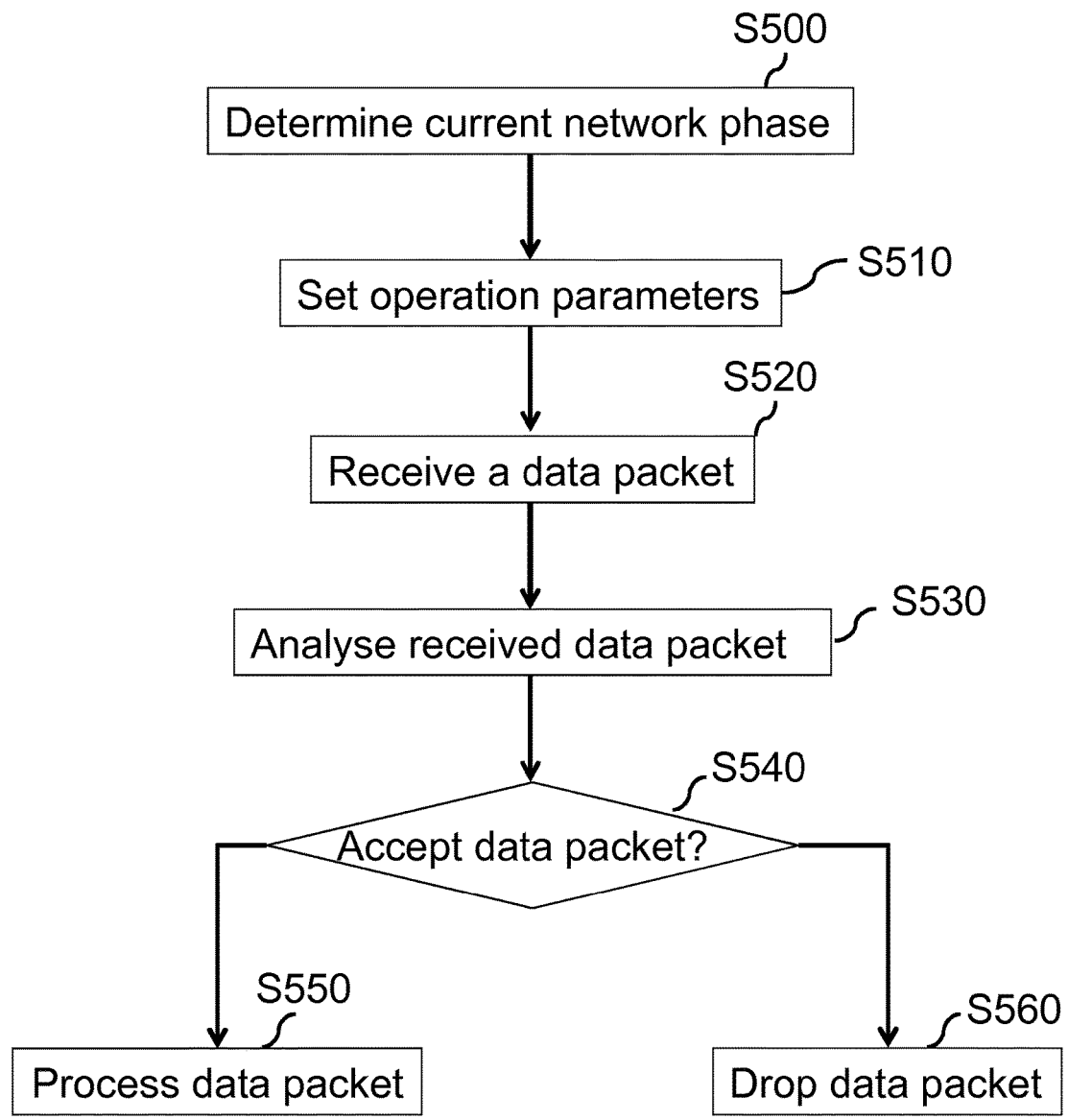
FIG. 5 shows a flow diagram for illustrating phase-aware behavior of a node according to an embodiment of the present invention.

In FIG. 5, an example for processing a received data packet corresponding to the current network phase is shown. As described above, the current network phase is determined either centrally or locally (S500). However, a node 10 knows about the current network phase and its operation parameters are set accordingly by the phase-adaptation module 110

(S510). If the node 10 receives a data packet (S520), the data packet is analyzed (S510). This analysis may only relate to checking whether the data packet is complying with the set operation parameters of the node 10, i.e. whether processing of the data packet is admitted according to the operation parameters. For instance, if the operation parameter stranger-acceptance-index is set to "false", the data packet is only accepted if the sender node and/or the forwarding node is known, e.g. listed in the routing table of the receiving node 10. Likewise, all other operation parameters may be checked in order to determine whether to accept the data packet. However, the analysis in step S530 may additionally include further analysis, e.g. with respect to at least one of the sender node, the forwarding node, from which the data packet is received, the destination node, or security parameters included in the data packet such as a counter C associated to the forwarding node, a message integrity code MIC or the like. Based on the result of the analysis, it is decided whether to accept the data packet or not (S540). If either the analysis of the data packet is negative or if it is determined that the data packet is not acceptable due to operation parameters of the node 10, the data packet is dropped (S540). However, if the data packet complies with the conditions of the operation parameters and if all additional analysis has been positive, the data packet is accepted in step (S550) and the phase-aware module 120 proceeds to process the data packet based on the current operation parameters. For instance, depending on the situation, the data packet can be forwarded to its next-hop node towards its final destination or it can be decoded, if the receiving node 10 is the final destination. Also, processing may comprise using information included in the data packet for updating routing tables or settings of the node 10, if this is allowed according to the operation parameters of the node 10. Therefore, since the operation parameters of the node 10 are set corresponding to the current network phase and received data packets are processed correspondingly, the behavior of the network nodes 10 can be adapted to the current network phase. By these means, the vulnerability of the network can be reduced to the minimum.

Figure 6:
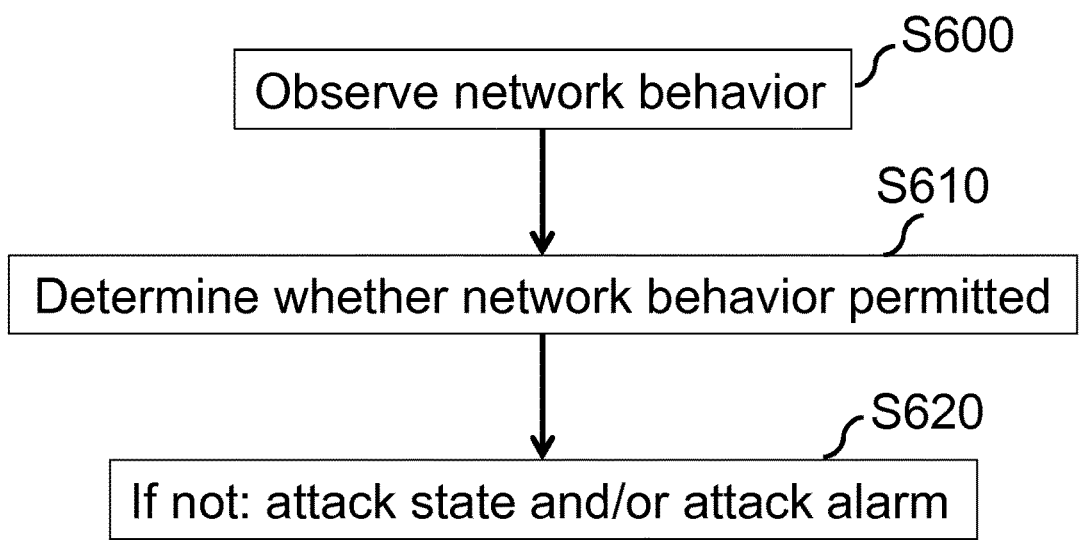
FIG. 6 shows a flow diagram for a process of monitoring network behavior according to an embodiment of the present invention.

In FIG. 6, a detection of an attack is illustrated according to an embodiment of the present invention. In general, the node 10 is aware of the current network phase and its operation parameters are set accordingly. For attack detection, the node 10 observes the network behavior either continuously or in predetermined time intervals (S600). For instance, the node 10 monitors the data traffic, e.g. by means of received data packets, data packets to be forwarded and the like. In step S610, the network behavior is analyzed in order to determine, whether the network behavior is allowed. This can be performed by the phase-aware module 120 of the node 10 based on the current operation parameters. In one example, this determination process of step S610 corresponds to the analysis of single data packets, e.g. as described with respect to FIG. 5, step S530. When the network behavior was found to be unusual or not allowed for the current network phase, the node 10 is set into an attack state (S620). In particular, if a node 10 notices that processing of a data packet is refused, e.g. due to the analysis result in step S530 or that it is not allowed to perform a requested action on the data packet, such as to forward a received data packet, the node 10 can determine an attack state (S620). Preferably, the attack state is not activated by a single incident, but after a certain number of such incidents. A corresponding threshold may be predefined at the node 10. After the attack state is activated, the node 10 can act accordingly. For instance, the node 10 can transmit an attack alarm to the network or the segment controller 60 or to the service center 80, using broadcast, unicast, flooding or the like, in order to activate the attack state at other nodes 10 or to inform the segment controller 60 or the service center 80. Moreover, the operation parameters of the node 10 in the attack state can be set to the most restrictive and secure settings. Preferably, also all received messages, which have to be forwarded, are dropped. By these means, an attack can be warded off, before it can do any harm to the network.

Therefore, according to the present invention, the initiation of hostile attacks can be impeded and ongoing hostile attacks can be blocked by means of a phase-aware node behavior. By admitting security holes in the network only during network phases, in which this is absolutely necessary for the operation of the network, the vulnerability of the network is minimized. Moreover, by the ability to switch the network into any of the network phases, the network remains flexible for upgrades, changes or extension. This can be all achieved according to the present invention, without complicating the single node operation or degrading the communication efficiency.

In the foregoing description, embodiments of the invention have been described using the example of a lighting system. However, many other networks and systems, in particular wireless networks using standards such as lightweight ZigBee-IP, 6LoWPAN/CoRE can benefit from the same basic principles to prevent attackers from launching DoS and other hostile attacks.

The invention claimed is:

1. A control unit for a node of a network, comprising:
a processor having a phase-adaptation module to adjust at least one operation parameter of the node based on a current network phase, wherein the current network phase is one of a plurality of network phases comprising at least one of a commissioning phase, a learning phase during which a node learns about its neighbors and an operating phase and wherein the at least one operation parameter enables a security for each respective network phase; and a phase-aware module to process a received data packet based on the operation parameter to enable the security for the current network phase.

2. A control unit according to claim 1, wherein the phase-aware module is further adapted to analyze received data packets for observing network behavior and to compare the observed network behavior to one or more predefined phase characteristics.

3. A control unit according to claim 1, wherein if an observed network behavior deviates from one or more predefined phase characteristics, an attack state is determined and/or an alarm is triggered.

4. A control unit according to claim 1, wherein a received data packet is dropped in an attack state.

5. A control unit according to claim 1, wherein processing a received data packet includes at least forwarding the data packet towards its destination and/or updating routing information and/or changing node settings.

6. A control unit according to claim 1, wherein the at least one operation parameter includes at least one of a threshold number of messages, a threshold frequency of messages, an area threshold, a maximum time threshold, a stranger-acceptance-index, a commissioning index, a setting-update-index and a routing-update-index.

7. A control unit according to claim 1, wherein a current network phase is determined based on phase characteristics and/or based on information provided by a central controller or service center.

8. A control unit according to claim 1, wherein the operation parameter or a set of operation parameters is predefined for at least one network phase.

9. A control unit according to claim 1, wherein the node is adapted to be switched to one of the network phases.

10. A control unit according to claim 1, wherein at least one of the network phases is limited to a time or area interval.

11. A control unit according to claim 1, wherein the node (10) is a luminaire node of a lighting system.

12. A system for a network, comprising:
   a plurality of nodes, at least some including a control unit according to claim 1; and
   a central controller;
   wherein the plurality of nodes and the central controller are adapted for wireless communication.

13. The system for a network according to claim 12, wherein the central controller or the nodes are adapted to determine a network phase based on an average status of at least a sub-set of nodes.

14. A method for operating a network with a plurality of nodes, comprising the steps of:
   adjusting at least one operation parameter of at least one node based on a current network phase, wherein the current network phase is one of a plurality of network phases comprising at least one of a commissioning phase, a learning phase during which a node learns about its neighbors and an operating phase and wherein the at least one operation parameter enables a security for each respective network phase; and
   processing a data packet received by the node based on the operation parameter to enable the security for the current network phase.

* * * * *